March 1, 1960 J. F. BIGELOW 2,927,205

ELECTRIC FILTER

Filed Oct. 27, 1952 2 Sheets-Sheet 1

INVENTOR.
JOHN F. BIGELOW
BY
Lockwood, Galt, Woodard, & Smith
ATTORNEYS

March 1, 1960 J. F. BIGELOW 2,927,205

ELECTRIC FILTER

Filed Oct. 27, 1952 2 Sheets-Sheet 2

INVENTOR.
JOHN F. BIGELOW

BY

Lockwood, Galt, Woodard, & Smith
ATTORNEYS

United States Patent Office 2,927,205

Patented Mar. 1, 1960

2,927,205

ELECTRIC FILTER

John F. Bigelow, Fort Wayne, Ind., assignor to International Telephone and Telegraph Corporation, a corporation of Maryland Application October 27, 1952, Serial No. 317,025

3 Claims. (Cl. 250—27)

The present invention relates to an electric filter and more particularly to an electrical system which is frequency selective and capable of distinguishing between signals of different frequencies.

In accordance with conventional practice, inductors, commonly referred to as filter chokes, are used in the plate voltage supply leads of radio frequency oscillators and the like for preventing the radio frequency signals from entering the power supply. It is a well known fact, that often times the filter choke becomes resonant at the natural frequency thereof and interferes with the proper operation of the oscillator circuit by causing the latter to drop out of oscillation.

Inductors are also conventionally used in frequency discriminating or bandpass filters, the inductors usually serving as a part of a network including both inductors and capacitors. Here again resonance in the inductors produces considerable difficulty in the proper design of the filters, and common deficiencies, by reason of undesirable resonance effects, in the filter appear in the form of phase discrepancies near the upper end of the pass-band frequencies and unevenness in the amplitude of the band of frequencies passed by the filter.

In view of the foregoing, it is an object of this invention to provide a very simple electric filter which obviates the use of inductors in the foregoing instances, and which will not produce the objectionable undesirable resonance effects as explained.

It is another object of this invention to provide an electric filter circuit which incorporates a gaseous discharge tube and which will discriminate between low and high frequency signals, the tube having the characteristics of rejecting high frequency signals, but passing low frequency signals.

It is another object of this invention to provide a filtering unit for use in the anode circuit of radio frequency oscillators or the like for restricting the conduction of the oscillator signal to the power supply over the anode power lead. Ancillary to this object, it is another object to provide a frequency selective, non-resonant filter in place of the filter choke conventionally used in the shunt path feeding anode potential to oscillator circuits or the like.

It is another object of this invention to provide a filter circuit which distinguishes between high and low frequency signals and which is characterized by the fact that it uses no inductors.

It is still a further object to provide a gaseous path in an electrical circuit and having impedance characteristics which varies with the frequency of a signal applied to that circuit.

Other objects will become apparent as the description proceeds.

In accordance with one form of this invention, it is proposed to use a gaseous discharge tube, such as the conventional neon gas tube, as a low-pass or high-pass filter, one alternative network including the tube in series with one of two conductive paths common to input and output circuits, and another alternative being to connect the tube across two such paths also common to the input and output circuits.

For a better understanding of the invention, together with other and further objects thereof, reference is made to the following description in connection with the accompanying drawings, and its scope will be pointed out in the appended claims.

Figure 1:
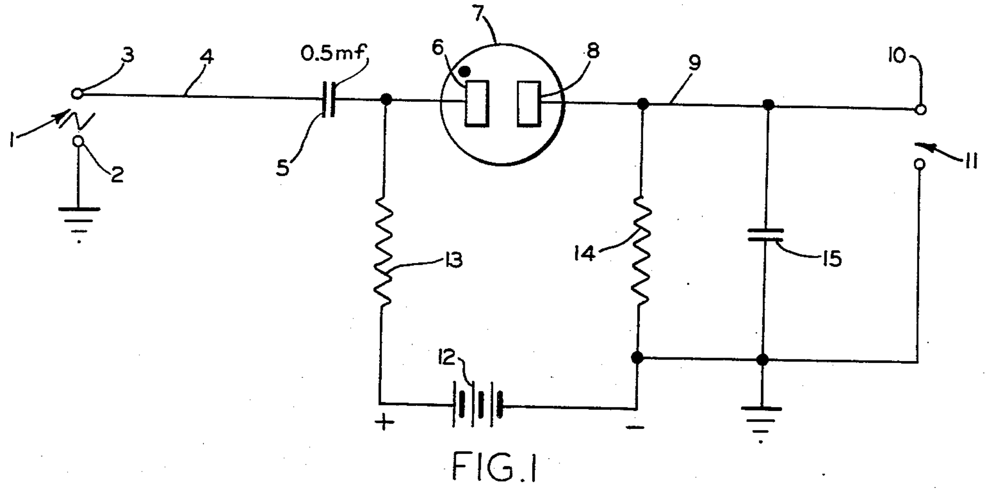
Fig. 1 is a circuit diagram of one embodiment of this invention which may be characterized as a low-pass filter.

With reference to the drawings, and to the circuit diagram of Fig. 1 in particular, the illustrated filter circuit comprises input connections, generally indicated by the reference numeral 1, having one of the terminals 2 grounded and the other terminal 3 coupled to the signal frequency which is to be passed by the filter. This condenser 5 is in turn coupled to one of the electrodes 6 of a gas discharge tube 7, the other electrode 8 being coupled by means of a wire 9 to an output terminal 10 of an output circuit generally indicated by the reference numeral 11. The two electrodes of the tube 7 are conductively connected to a source of direct current, by means of two current-limiting resistors 13 and 14 which are connected to the electrodes 6 and 8, respectively. A condenser 15 is preferably shunted across the resistor 14, but its use is not absolutely necessary in realizing suitable performance by the remainder of the circuit. When this condenser 15 is used, it should have a capacity which provides a low reactance path for the high frequencies which are sought to be excluded from the output circuit 11, the exact value of capacity being selected in accordance with principles well known in the art of electronics.

The tube 7 is conventional in design and in the preferred arrangement comprises a glass envelope filled with a gas, such as one of the noble gases which can be readily ionized. The two electrodes 6 and 8 are disposed in spaced relation inside the envelope and are submerged in the gas whereby the application of an ionizing potential to the electrodes 6 and 8 will cause the gas to ionize and to conduct a current in a manner well known to the art.

In the operation of the circuit of Fig. 1, a composite alternating signal is applied to the input circuit 1, and for convenience in explaining the operation, it is assumed that this composite signal contains frequencies in the order of two kilocycles and 20 megacycles, it being desired to separate these two frequencies and to derive only the two kilocycle signal from the output circuit 11. This composite signal is applied to the electrode 6 of the tube 7, and with the gas in this tube ionized by means of the battery 12, the high frequency signal is rejected by the tube, or in other words, the tube presents an extremely high impedance to the passage of the high frequencies therethrough, while the low frequency signal passes through with negligible loss and appears at the terminals of the output circuit 11. The condenser 15 is effective to by-pass any high frequencies which may have passed through the tube 7 to ground and thereby prevent the appearance thereof at the output circuit 11.

The exact value of the voltage used for ionizing the gas is not critical, the preferable range being such that the tube is not caused to de-ionize by peaks of the applied signal.

The resistors 13 and 14 serve to limit the current passing through the tube 7 as the result of the application of the battery voltage 12, the exact values of resistance used being dependent upon the type of tube 7 used, and the potential of battery 12.

As will be understood from the foregoing explanation, the gaseous discharge tube is frequency discriminative, and can therefore be used in conjunction with suitable circuitry to serve as a frequency discriminating or filtering device. While there does not appear to be any single universally accepted theory of operation of the gaseous discharge tube, it is believed that the frequency discriminating characteristic is derived from the fact that the ionization-de-ionization time of the gas is a finite value which constitutes a controlling limitation on the frequency of a signal sought to be conducted by the gas. It is believed that a signal frequency above the critical value at which the gas presents a high impedance, sufficient for the gas to alter its ionization, which is a requirement to conduction of alternating current, so that the conducting qualities of the ionized gas are not allowed to carry through the necessary gas cycle of conduction. The observable result is, then, the rejection of the high frequencies, but the passage of the low frequencies.

Figure 2:
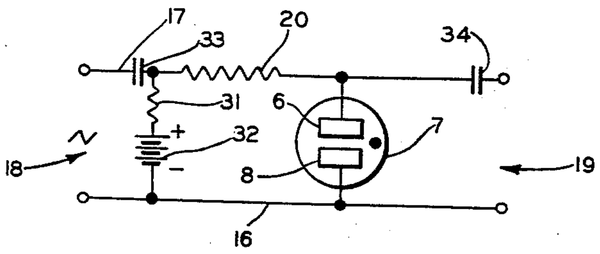
Fig. 2 is a circuit diagram of another embodiment of the present invention which may be characterized as a high-pass filter.

With reference to the embodiment shown in Fig. 2, the tube 7 is used as a component part of a high pass filter circuit, this circuit comprising essentially only the two parallel lines 16 and 17 having an input circuit at 18 and an output circuit at 19. An isolating resistor 20 is preferably connected in series with the line 17 for use in effecting a separation of the input and output circuits from each other. The tube 7 has its electrodes 6 and 8 connected to the lines 17 and 16 respectively, and since as explained previously low frequencies will be passed by the tube but high frequencies will be rejected thereby, it is seen that the low frequencies will be effectively short circuited from the output circuit 19, but the high frequency signal will continue beyond the tube 7 and appear at the terminals of the output circuit 19. It is necessary to use a source of ionizing potential across the tube 7 as explained in connection with the embodiment of Fig. 1, represented as battery 32, resistors 20 and 31, capacitors 17 and 34 are for the purpose of isolating the ionizing potential from circuits 18 and 19.

Figure 3:
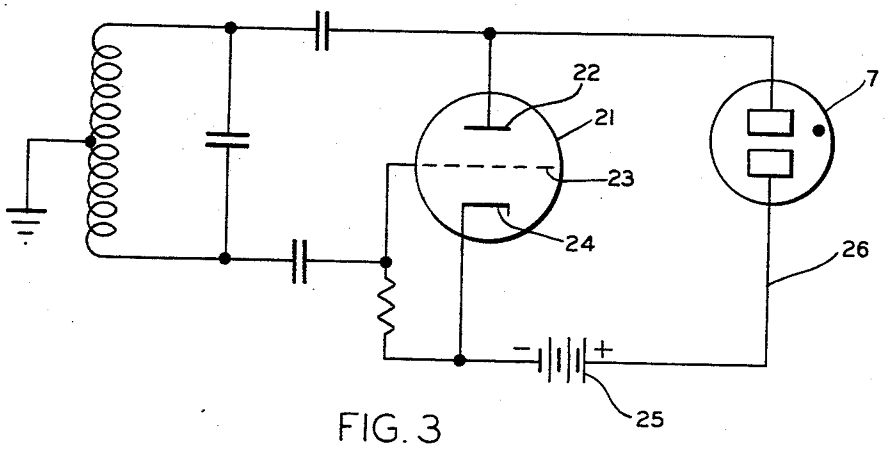
Fig. 3 is a circuit diagram of an oscillator incorporating another embodiment of this invention.

In Fig. 3 is shown a conventional shunt-fed oscillator circuit having a tube 21 which contains the usual electrodes such as the anode 22, the control grid 23, and the cathode 24. A battery 25 is connected with its minus terminal to the cathode 24 and its positive terminal to the anode 22, the anode circuit normally including an inductor connected in series with the anode supply lead 26. However, in the present instance, the tube 7 replaces the usual inductor and, as will be appreciated in view of the foregoing discussion, will serve as a radio frequency choke or filter, preventing the radio frequency signals which normally appear at the anode 22 from being conducted by the supply lead 26 back to the B plus supply 25. The advantages to be gained by using the tube 7 in conjunction with the oscillator circuit have been explained hereinbefore, the principal advantage residing in the fact that the tube 7 is non-resonant and therefore cannot interfere with the oscillating characteristics of the circuit proper over a very wide range of operating frequency. Another important advantage is the economy effected in using the tube 7 in place of the usual inductor. It is, of course, the factor of low cost which makes the device of further material importance, since the use of such a device will naturally result in lower cost of equipment manufactured for public consumption.

Figure 4:
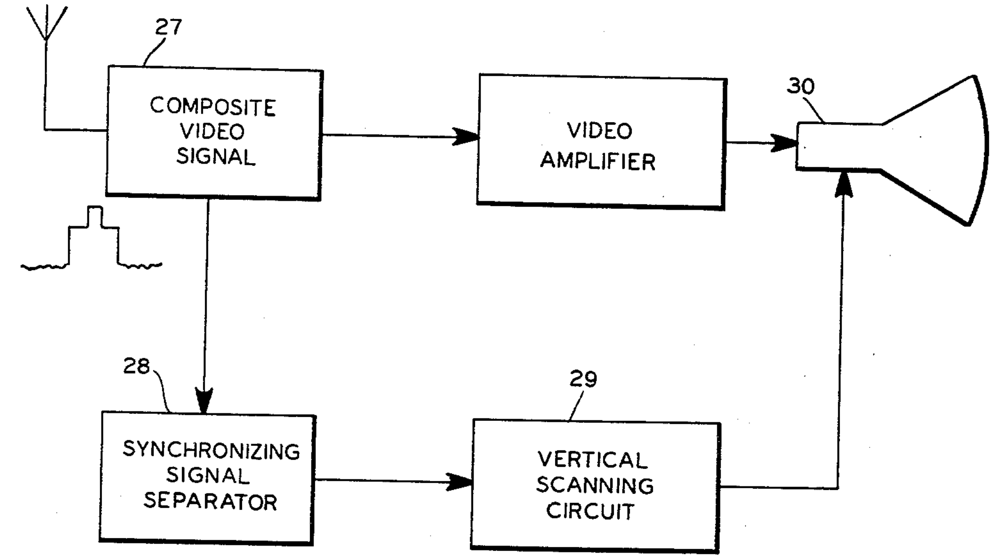
Fig. 4 is a block diagram of a portion of a television receiver which utilizes one form of the present invention.
Figure 5:
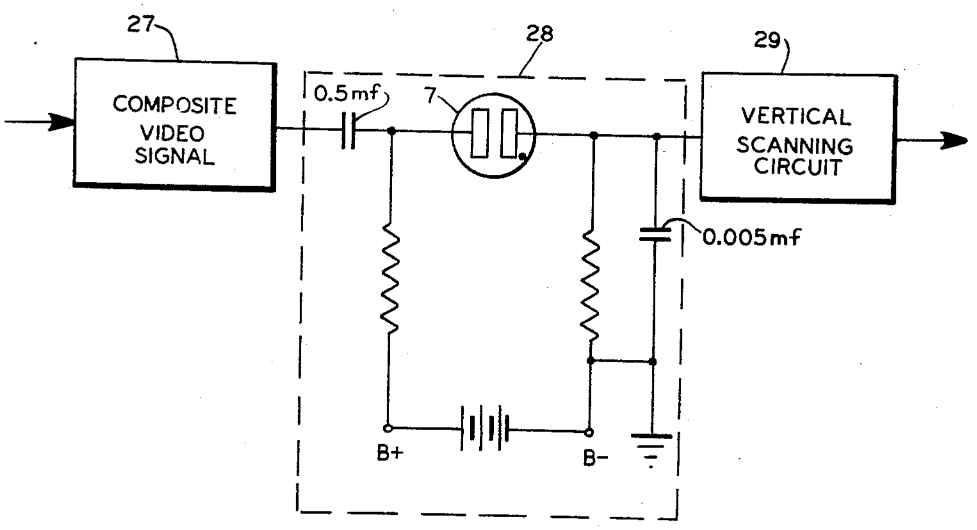
Fig. 5 is a circuit diagram of one of the blocks of Fig. 4.

In addition to the use of the present invention as depicted by Fig. 3, it has been found that the present invention may be embodied in television receiver systems as illustrated in Figs. 4 and 5. In Fig. 4, the demodulated video signal derived from the usual R.F. and detector circuits of a conventional television receiver, as designated by the reference numeral 27, is fed to the synchronizing signal separator circuit 28 which functions to separate the horizontal and vertical synchronizing signals contained in the composite video signal, and to feed the vertical synchronizing signals to the usual vertical scanning circuits illustrated by the block having the reference numeral 29.

As seen in Fig. 5, the separator 28 consists of a circuit substantially identical to the one appearing in Fig. 1. Since the horizontal synchronizing signals appearing in the composite video signal are of extremely short duration and therefore are high frequency signals in character, the tube 7 will reject the horizontal signals but will pass the vertical synchronizing signals which are appreciably longer in time duration and consequently of such frequency as can be accommodated and passed by the tube 7. Thus, the signal appearing at the input circuit of the vertical scanning circuits 29 will be predominantly the vertical synchronizing pulses which are then used in the conventional manner in the reproduction of the television picture by the picture tube 30.

It has been revealed that the embodiment shown in Fig. 5 performs exceptionally well as a synchronizing signal separator in television circuits, and since this is true, it is easily recognized that a substantial saving in the cost of a television receiver has been effected by the elimination of the usual separator circuits. Also, the vertical scanning circuit appears to be less affected by impulse noises of certain types, which are often superimposed on the received composite signal.

While it will be understood that the circuit specifications of the various filtering circuits of this invention as described in the foregoing may vary according to preferences in design, the following circuit specifications for a typical filtering circuit are included, by way of example only, as suitable for use in the separation of the vertical and horizontal synchronizing components of a composite video signal.

| Reference numeral: | Value |
|---|---|
| Condenser **5** | .05 mfd. |
| Tube **7** | 1/25 watt neon bulb. |
| Battery **12** | 235 volts. |
| Resistor **13** | .47 megohm. |
| Resistor **14** | 4700 ohms. |
| Condenser **15** | .0047 mfd. |

While there has been described what is at present considered the preferred embodiments of this invention, it will be obvious to those skilled in the art, that various changes and modifications may be made therein without departing from the invention, and it is, therefore, intended in the appended claims to cover all such changes and modifications as fall within the spirit and scope of this invention.

What is claimed is:

1. In a television receiver, a circuit for separating the vertical and horizontal synchronizing signals of a composite video signal comprising first circuit means for providing a signal containing both vertical and horizontal synchronizing signals, second circuit means operative to produce scanning signals for use in reproducing a television picture, a frequency sensitive gaseous discharge tube connected in series between both said circuit means, and operative to pass said vertical signals but to reject said horizontal signals, and a source of ionizing potential applied to said tube for ionizing the gas therein.

2. In a television receiver, a circuit for separating the vertical and horizontal synchronizing signals of a composite video signal comprising first circuit means for providing a signal containing both vertical and horizontal synchronizing signals, second circuit means operative to produce scanning signals for use in reproducing a television picture, and a path of ionized gas conductively connected in series between both said circuit means and operative to pass said vertical signals but to reject said horizontal signals.

3. In a television receiver, a circuit for separating the vertical and horizontal synchronizing signals of a composite video signal comprising first circuit means for providing a signal containing both vertical and horizontal synchronizing signals, second circuit means operative to produce scanning signals for use in reproducing a television picture, a signal-carrying line interconnecting both circuit means for conducting a synchronizing signal to said second circuit means, a gaseous discharge tube included in series with said line and operative to reject the horizontal signals but to pass the vertical signals whereby only the vertical signals are supplied to said second circuit means.

References Cited in the file of this patent

UNITED STATES PATENTS

| | | |
|---|---|---|
| 1,908,191 | Schriever | May 9, 1933 |
| 1,951,416 | Hund | Mar. 20, 1934 |
| 1,984,499 | St. Laurent | Dec. 18, 1934 |
| 2,045,542 | Koch | June 23, 1936 |
| 2,282,340 | Pieplow | May 12, 1942 |
| 2,522,139 | Schoenbaum | Sept. 12, 1950 |
| 2,551,250 | Dome | May 1, 1951 |
| 2,599,945 | Schmitt | June 10, 1952 |
| 2,631,194 | Reeves | Mar. 10, 1953 |

FOREIGN PATENTS

| | | |
|---|---|---|
| 214,754 | Great Britain | May 1, 1924 |
| 433,545 | Great Britain | Aug. 16, 1935 |